(12) United States Patent
Omura (10) Patent No.: US 12,347,875 B2
(45) Date of Patent: Jul. 1, 2025

(54) POWER STORAGE DEVICE

(71) Applicant: Panasonic Holdings Corporation, Osaka (JP)

(72) Inventor: Tetsuji Omura, Hyogo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 534 days.

(21) Appl. No.: 17/756,202

(22) PCT Filed: Nov. 13, 2020

(86) PCT No.: PCT/JP2020/042415
§ 371 (c)(1),
(2) Date: May 19, 2022

(87) PCT Pub. No.: WO2021/106629
PCT Pub. Date: Jun. 3, 2021

(65) Prior Publication Data
US 2022/0407154 A1    Dec. 22, 2022

(30) Foreign Application Priority Data

Nov. 29, 2019  (JP) .................................. 2019-217427

(51) Int. Cl.
*H01M 50/107* (2021.01)
*H01M 50/179* (2021.01)
(Continued)

(52) U.S. Cl.
CPC ....... *H01M 50/107* (2021.01); *H01M 50/179* (2021.01); *H01M 50/186* (2021.01);
(Continued)

(58) Field of Classification Search
CPC .. H01M 50/103; H01M 50/107; H01M 50/15; H01M 50/169; H01M 50/179;
(Continued)

(56) References Cited

U.S. PATENT DOCUMENTS

2006/0246349 A1    11/2006 Uh

FOREIGN PATENT DOCUMENTS

| CN | 1855581 A | 11/2006 |
|---|---|---|
| JP | 2006-310268 | 11/2006 |
| JP | 2018-190510 | 11/2018 |

OTHER PUBLICATIONS

International Search Report of PCT application No. PCT/JP2020/042415 dated Jan. 19, 2021.
(Continued)

*Primary Examiner* — Lingwen R Zeng
(74) *Attorney, Agent, or Firm* — Rimon P.C.

(57) ABSTRACT

A power storage device includes: an electrode assembly including a positive-electrode plate, a negative-electrode plate, and a separator which are stacked on one another, the separator being disposed between the positive-electrode plate and the negative-electrode plate; an exterior can accommodating the electrode assembly and an electrolyte solution therein, the exterior can having a side wall with a tubular shape and an opening provided at least at one end of the side wall; a sealing plate closing the opening of the exterior can; and a holding member including one or more facing parts accommodated in the exterior can, each facing part facing the side wall in a first direction and projecting toward the side wall.

18 Claims, 5 Drawing Sheets

(51) Int. Cl.
  *H01M 50/186*  (2021.01)
  *H01M 50/46*   (2021.01)
  *H01M 50/55*   (2021.01)
  *H01G 11/78*       (2013.01)
  *H01M 50/103*      (2021.01)
  *H01M 50/15*       (2021.01)
  *H01M 50/169*      (2021.01)
  *H01M 50/586*      (2021.01)
  *H01M 50/593*      (2021.01)

(52) U.S. Cl.
  CPC ........... *H01M 50/46* (2021.01); *H01M 50/55* (2021.01); *H01G 11/78* (2013.01); *H01M 50/103* (2021.01); *H01M 50/15* (2021.01); *H01M 50/169* (2021.01); *H01M 50/586* (2021.01); *H01M 50/593* (2021.01)

(58) Field of Classification Search
  CPC .... H01M 50/186; H01M 50/46; H01M 50/55; H01M 50/586; H01M 50/593; H01G 11/78
  See application file for complete search history.

(56) References Cited

OTHER PUBLICATIONS

English Translation of Chinese OA dated Jun. 29, 2023 for the related Chinese Patent Application No. 202080081762.2.

POWER STORAGE DEVICE

CROSS-REFERENCE TO RELATED APPLICATIONS

This application is a U.S. national stage application of the PCT International Application No. PCT/JP2020/042415 filed on Nov. 13, 2020, which claims the benefit of foreign priority of Japanese patent application No. 2019-217427 filed on Nov. 29, 2019, the contents all of which are incorporated herein by reference.

TECHNICAL FIELD

The present disclosure relates to a power storage device.

BACKGROUND ART

Conventionally, as one of energy storage devices, for example, as disclosed in PTL 1, a power storage device in which a sealing plate is welded to an opening of an exterior can is disclosed.

CITATION LIST

Patent Literature

PTL 1: Japanese Patent Laid-Open Publication No. 2018-190510

SUMMARY OF THE INVENTION

A power storage device has a risk of expanding due to various factors such as aging degradation and expansion or contraction of an electrode assembly. As described above, when the power storage device in which the sealing plate is joined to the opening of the exterior can expand, mechanical stress is easily applied to the peripheral edge of the side surface of the exterior can. A part of the peripheral edge of the side wall constitutes the opening. Therefore, there is a risk that the mechanical stress is also applied to the joint of the opening and the sealing plate. When the excessive stress is generated in the joint, there is a risk that the joint is broken.

A power storage device according to an aspect of the present disclosure includes: an electrode assembly having a positive-electrode plate and a negative-electrode plate stacked with a separator provided between the positive-electrode plate and the negative-electrode plate; an exterior can accommodating the electrode assembly and an electrolyte solution therein and including a side wall with a tubular shape and an opening disposed at least at one end of the side wall; a sealing plate closing the opening of the exterior can; and a holding member including one or more facing parts accommodated in the exterior can, each facing parts facing the side wall in a first direction and projecting toward the side wall.

According to the aspect of the present disclosure, in the power storage device in the initial state, the side wall of the exterior can may expand by a certain amount. In this power storage device, the amount of deformation is smaller than that in a power storage device including an exterior can that does not expand in the initial state, regarding the amount of deformation of the side wall of the exterior can that has expanded from the initial state to the limit. Therefore, the mechanical stress generated at the joint between the exterior can and the sealing plate can be reduced when the exterior can is expanded to the limit. This configuration enhances reliability of the power storage device.

DESCRIPTION OF EMBODIMENT

An exemplary embodiment of the present disclosure will be described below with reference to the drawings. The shape, material, and number described below are examples for description, and can be appropriately changed according to the specification of a power storage device. In the following description, the same elements are denoted by the same reference marks in all the drawings.

Figure 1:
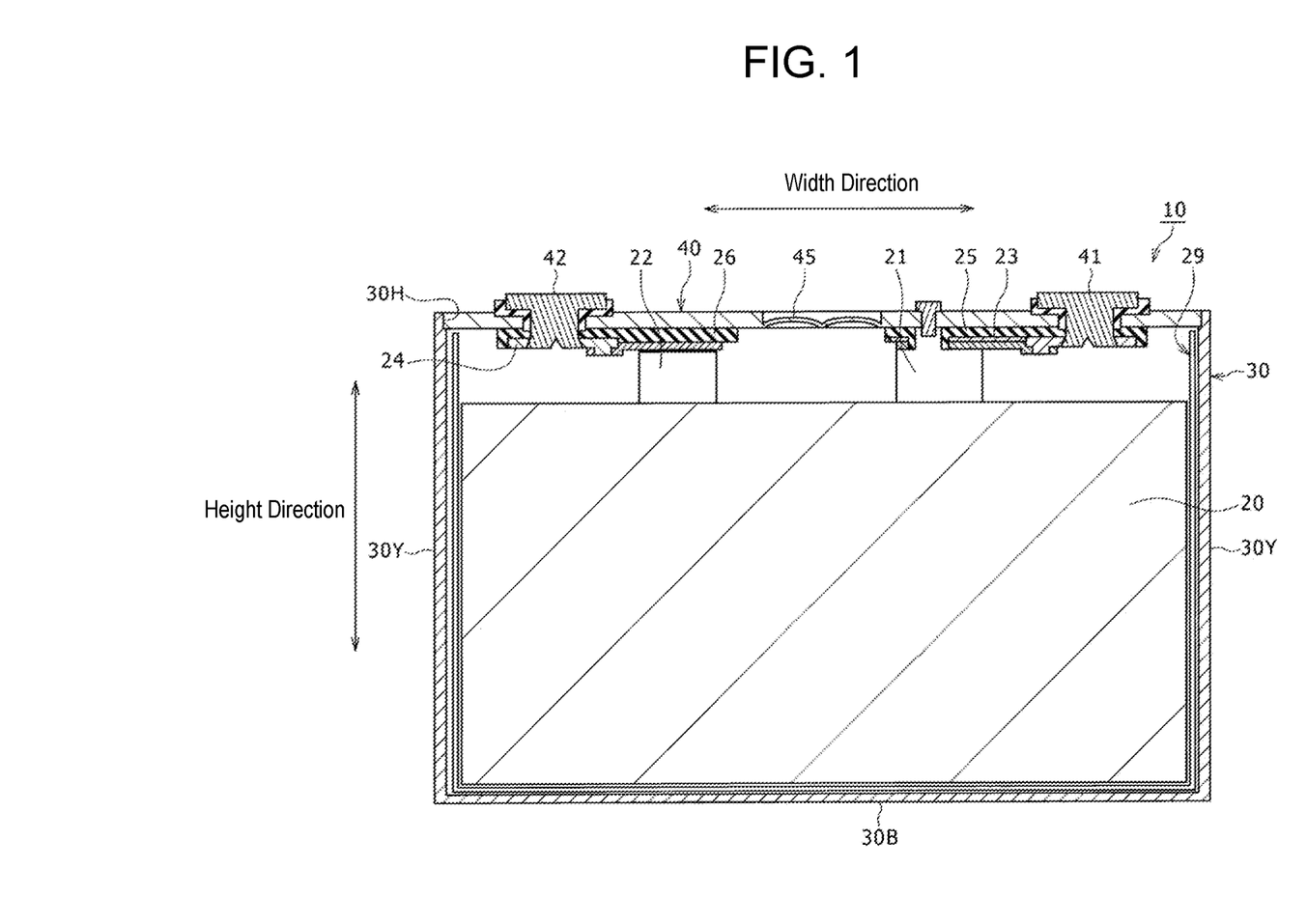
FIG. 1 is a cross-sectional view of a power storage device according to an exemplary embodiment.

Power storage device 10 which is an example of the exemplary embodiment will be described below with reference to FIG. 1. FIG. 1 is a cross-sectional view of power storage device 10.

Power storage device 10 which is an example of the exemplary embodiment is a non-aqueous electrolyte secondary battery, preferably, a lithium-ion battery. Power storage device 10 may be a nickel metal hydride battery or an electric double layer capacitor. Power storage device 10 is used for, for example, a drive power source of an electric vehicle or a hybrid vehicle, or a stationary power storage system for peak shifting of system power. Power storage device 10 includes: electrode assembly 20 in which a positive-electrode plate and a negative-electrode plate are stacked on one another with a separator disposed between the positive-electrode plate and the negative-electrode plate; exterior can 30 accommodating electrode assembly 20 and an electrolyte solution therein; and sealing plate 40 closing an opening of exterior can 30. Power storage device 10 further includes holding member 50 which will be detailed later (see FIG. 2).

Hereinafter, for convenience of description, a direction in which the side of sealing plate 40 in exterior can 30 is an upper side and the side opposite to sealing plate 40 is a lower side is defined as a height direction. A direction in which positive-electrode terminal 41 and negative-electrode terminal 42 are aligned is defined as a width direction. A direction perpendicular to the height direction and the width direction is defined as a depth direction, a first direction (see FIG. 2).

Electrode assembly 20 is formed by stacking a positive-electrode plate, a negative-electrode plate, and a separator on one another. All the positive-electrode plate, the negative-electrode plate, and the separator substantially have rectangular sheet shapes. The positive-electrode plate, the negative-electrode plate, and the separator which are stacked are restrained with a fixing tape. The positive-electrode plate or the negative-electrode plate may be bonded and fixed to the separator with adhesive applied to a surface of the separator facing the positive-electrode plate or the negative-electrode plate. Electrode assembly 20 is accommodated in insulating holder 29 including a bottom and having an upper end opening. Insulating holder 29 substantially has a rectangular-parallelepiped shape. Electrode assembly 20 is disposed in exterior can 30 such that a stacking direction in which the positive-electrode plate and the negative-electrode plate are stacked is parallel to the depth direction of exterior can 30. Electrode assembly 20 may be formed by winding a positive-electrode plate with a strip shape and a negative-electrode plate with a strip shape while a separator with a strip shape provided between the positive-electrode plate and the negative-electrode plate to constitute a wound body. The wound body is flattened to form a flat wound body. At this moment, the stacking direction of electrode assembly 20 may be a thickness direction of the flat wound body.

The positive-electrode plate includes, for example, a core made of an aluminum foil having a thickness of 15 μm, electrode layers formed on front and back surfaces of the core, an exposed-core part where no electrode layer is formed on the core, and positive-electrode lead 21 which is a part of the exposed-core part and is extended from an upper end of the exposed-core part.

Each electrode layer of the positive electrode contains, for example, an active material, a conductive agent, and a binder. For the positive electrode, lithium-nickel-cobalt-manganese composite oxide can be used as the active material, polyvinylidene fluoride (PVdF) can be used as the binder, a carbon material can be used as the conductive agent, and N-methylpyrrolidone (NMP) can be used as a dispersion medium. When the electrode layer is formed, a slurry containing the active material, the conductive agent, the binder, and a dispersant is prepared. After that, the slurry is applied on both surfaces of the core of the positive electrode. Then, by drying this, the dispersion medium in the slurry is removed, and an electrode layer is formed on the core. After that, the electrode layer is compressed to have a predetermined thickness. The positive-electrode plate thus obtained is cut to have a predetermined shape.

The negative-electrode plate includes, for example, a core made of a copper foil having a thickness of 8 μm, electrode layers formed on front and back surfaces of the core, an exposed-core part where no electrode layer is formed on the core, and negative-electrode lead 22 which is a part of the exposed-core part and is extended from an upper end of the exposed-core part.

Each electrode layer of the negative electrode contains, for example, an active material, a conductive agent, a binder, and a thickener. For the negative electrode, graphite can be used as the active material, styrene butadiene rubber (SBR) can be used as the binder, carboxymethyl cellulose (CMC) can be used as the thickener, and water can be used as a dispersion medium. When the electrode layer is formed, a slurry containing the active material, the conductive agent, the binder, and the thickener is prepared. After that, the slurry is applied on both surface of the core of the negative electrode. Then, by drying this, the dispersion medium in the slurry is removed, and an electrode layer is formed on the core. After that, the electrode layer is compressed to have a predetermined thickness. The negative-electrode plate thus obtained is cut to have a predetermined shape.

As the separator, for example, a resin separator can be used. As the resin, polyolefin, polyethylene, or polypropylene can be used.

Positive-electrode lead 21 is electrically connected via electrical collector 23 to positive-electrode terminal 41 provided on sealing plate 40. Positive-electrode leads 21 of which number is the number of positive-electrode plates constituting electrode assembly 20 are provided. Positive-electrode leads 21 are joined to electrical collector 23 while respective distal end of the leads in the extending direction are bundled. Positive-electrode lead 21 may be joined to electrical collector 23 by ultrasonic welding, resistance welding, laser welding, cold pressure welding or the like.

Negative-electrode lead 22 is electrically connected via electrical collector 24 to negative-electrode terminal 42 provided on sealing plate 40. Negative-electrode leads 22 of which number is the number of negative-electrode plates constituting electrode assembly 20 are provided. Negative-electrode leads 22 are joined to electrical collector 24 while respective distal ends of the leads in the extending direction are bundled. Negative-electrode lead 22 may be joined to electrical collector 24 by ultrasonic welding, resistance welding, laser welding, cold pressure welding or the like.

Electrical collector 23 of the positive electrode is made of, for example, an aluminum plate material. One end of electrical collector 23 is connected to positive-electrode lead 21 and another end of electrical collector 23 is connected to positive-electrode terminal 41. Insulator 25 is disposed between electrical collector 23 and sealing plate 40.

Positive-electrode terminal 41 and electrical collector 23 may be electrically connected via a current interrupt device (CID). The CID is a safety device configured to cut off the electrical connection between electrical collector 23 and positive-electrode terminal 41 when gas is generated inside exterior can 30 and cause the inside of exterior can 30 to exceed a predetermined pressure in the event of abnormality in power storage device 10. The current interrupt device includes, for example, an inverting plate and a conductive cap which electrically connects the inverting plate to positive-electrode terminal 41. The inverting plate is connected to the other end of electrical collector 23 and is deformed in a direction away from electrical collector 23 upon receiving pressure inside exterior can 30. The conductive cap has a conductor with a dish shape having an opening provided in the lower side (close to electrode assembly 20) and an upper surface located on the upper side (close to sealing plate 40). A connection hole is formed on the upper surface, and positive-electrode terminal 41 is inserted in the connection hole.

Electrical collector 24 of the negative electrode is made of, for example, a copper plate material. One end of electrical collector 24 is connected to negative-electrode lead 22 and another end of the collector is connected to negative-electrode terminal 42. Insulator 26 is disposed between electrical collector 24 and sealing plate 40.

Exterior can 30 is, for example, a rectangular case including bottom 30B, a side wall having a rectangular tubular shape extended from a peripheral edge of bottom 30B, and opening 30H located at an end of the side wall opposite to bottom 30B. Exterior can 30 is made of, for example, metal such as aluminum. Exterior can 30 may be formed by, for example, drawing an aluminum material. The tubular side wall includes two long walls 30X and 30X (see FIG. 4) facing each other in the depth direction and two short walls 30Y and 30Y facing each other in the width direction.

The thickness of each wall of the side wall may be thin enough to sufficiently bend when holding member 50 described later is inserted into exterior can 30 and holds long walls 30X facing each other in the depth direction of exterior can 30. Sealing plate 40 is welded to exterior can 30.

Positive-electrode terminal 41 and negative-electrode terminal 42 are disposed on sealing plate 40 and apart from each other in the longitudinal direction (width direction in FIG. 1) of sealing plate 40. Positive-electrode terminal 41 and negative-electrode terminal 42 protrude from a top surface of sealing plate 40. Sealing plate 40 is formed by, for example, processing a plate made of aluminum. Sealing plate 40 is located on opening 30H of exterior can 30, and may be welded to the opening end of exterior can 30 by, for example, a laser or the like to seal exterior can 30.

Sealing plate 40 may have a liquid-filling hole therein through which an electrolyte solution is put into exterior can 30. Sealing plate 40 may include a liquid-filling plug that closes the liquid-filling hole. Sealing plate 40 may include pressure regulating valve 45 surrounded by plural grooves. Pressure regulating valve 45 is configured to discharge the gas in exterior can 30 to the outside by tearing the grooves when the inside of exterior can 30 exceeds a predetermined pressure. In addition, an annular groove is preferably formed along the peripheral edge on the top surface of sealing plate 40. With this configuration, when sealing plate 40 and opening 30H of exterior can 30 are joined by welding, the peripheral edge of sealing plate 40 can be efficiently melted.

Positive-electrode terminal 41 passes through a terminal hole in sealing plate 40, and has one end exposed to the outside of exterior can 30 and another end accommodated in exterior can 30. Positive-electrode terminal 41 is fixed to the conductive cap by the other end of positive-electrode terminal 41 being inserted into a connection hole provided in the upper surface of the conductive cap and being crimped so as to expand in the radial direction. Positive-electrode terminal 41 is made of, for example, a tube made of aluminum.

Negative-electrode terminal 42 passes through a terminal hole of sealing plate 40, and has one end exposed to the outside of exterior can 30 and another end accommodated in exterior can 30. Negative-electrode terminal 42 is made of, for example, a clad material in which another end of the clad material connected to electrical collector 24 inside exterior can 30 is made of a copper material and one end of the clad material exposed to the outside of exterior can 30 is made of aluminum. Another rend of negative-electrode terminal 42 is fixed to sealing plate 40 together with electrical collector 24 by being crimped so as to spread in the radial direction.

Figure 2:
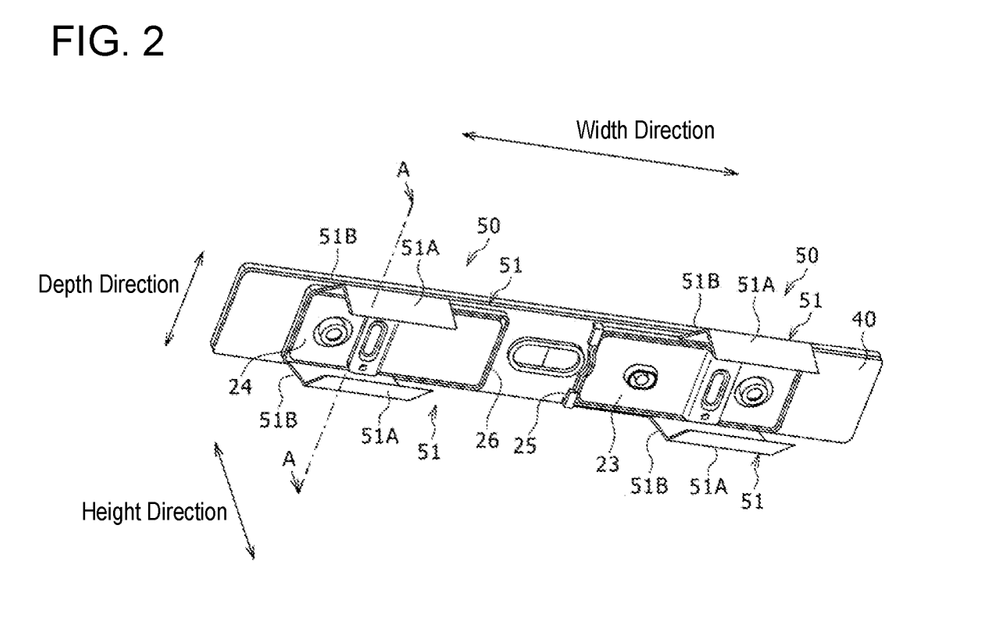
FIG. 2 is a perspective view of a holding member according to the exemplary embodiment.
Figure 3:
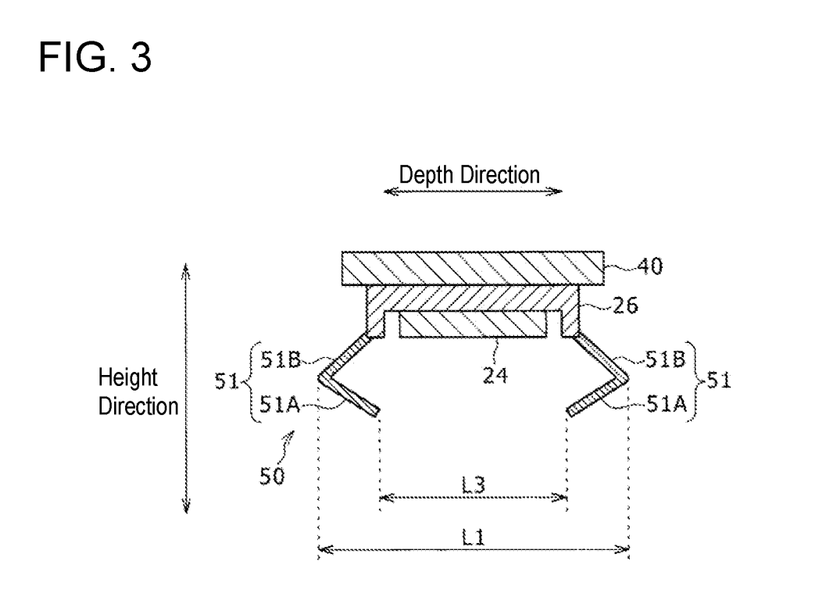
FIG. 3 is a cross-sectional view of the device taken along line AA shown in FIG. 2.

Holding member 50 which is an example of the exemplary embodiment will be described with reference to FIGS. 2 and 3. FIG. 2 is a perspective view of sealing plate 40. FIG. 3 is a cross-sectional view of the plate taken along line AA shown in FIG. 2.

Figure 4:
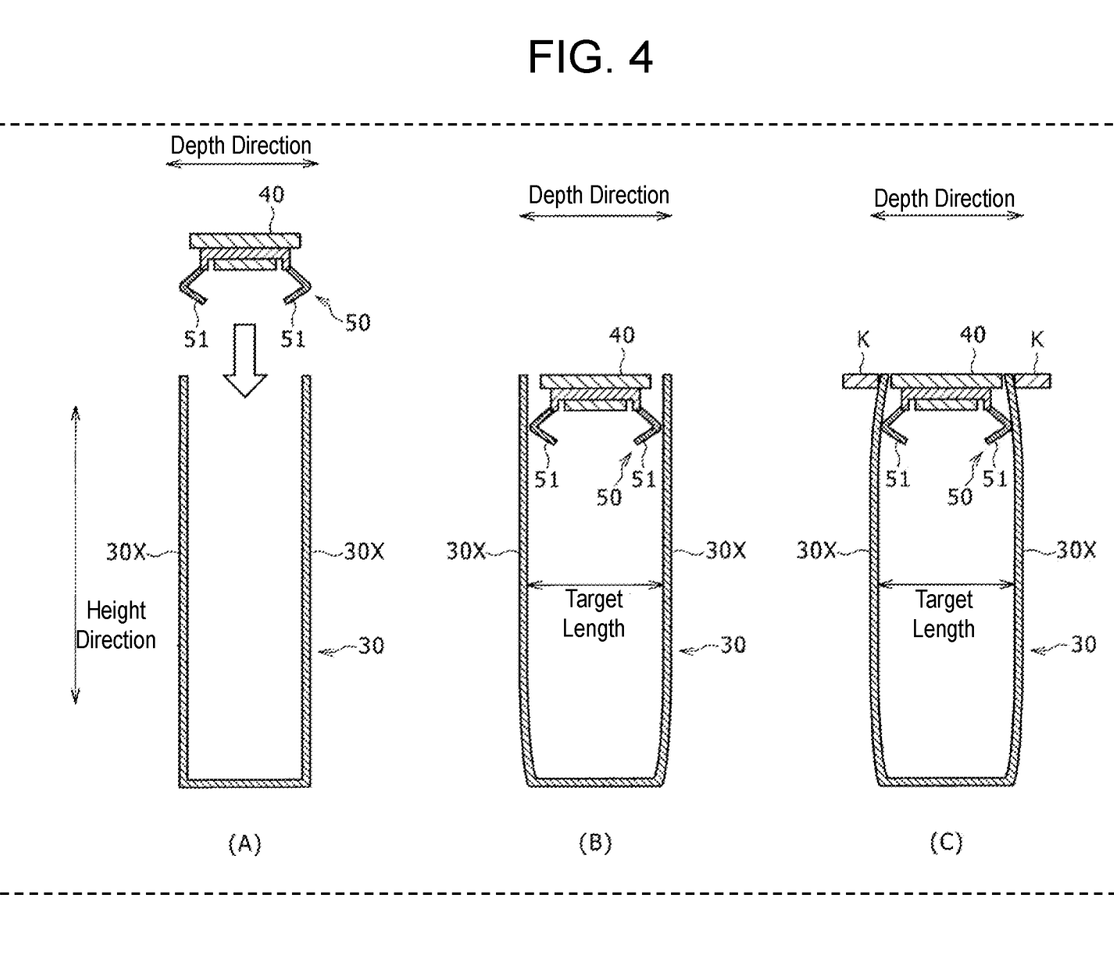
FIG. 4 is a schematic view of the device for illustrating a part of a manufacturing process of the power storage device.

Holding member 50 which is an example of the exemplary embodiment is accommodated in exterior can 30, faces long walls 30X facing each other in the depth direction of exterior can 30 to allow exterior can 30 to expand in the depth direction, and holds long walls 30X (see FIG. 4). According to holding member 50, sealing plate 40 can be welded to exterior can 30 in a state of exterior can 30 being expanded.

As illustrated in FIG. 2, holding members 50 of the present exemplary embodiment are provided on, for example, the positive electrode side and the negative electrode side in the width direction, respectively. Holding member 50 includes a pair of holding pieces 51 (facing parts) respectively facing long walls 30X facing each other in the depth direction, and meanwhile, holding long walls 30X. A distal end of a projecting portion of the facing part contacts long wall 30X. When power storage device 10 is viewed in the height direction, at least a part of long wall 30X overlaps at least a part of holding piece 51.

Holding piece 51 extends downward in the height direction at both ends of sealing plate 40 in the depth direction. Holding pieces 51 are respectively provided, for example, at both ends of each of insulators 25 and 26 in the depth direction, respectively, and are provided at a total of four locations. Holding member 50 preferably interfere with none of positive-electrode lead 21 and negative-electrode lead 22 of electrode assembly 20 when accommodated in exterior can 30. For example, holding pieces 51 may be provided only at outer portions of two halves of each of insulators 25 and 26 in the width direction at both ends of each of insulators 25 and 26 in the depth direction. Alternatively, in the case that holding member 50 is provided at one location in the width direction, holding member 50 may overlap a midpoint portion of exterior can 30 in the width direction.

Holding piece 51 is made of an insulating material and may be formed integrally with each of insulators 25 and 26, and may be made of the same material as insulators 25 and 26. In addition, holding piece 51 may have elasticity (for example, flexibility) in the depth direction.

Holding piece 51 is an elongated member having a substantially V-shape in a cross section thereof perpendicular to the width direction, and has a substantially V-shaped bent part facing the outside in the depth direction. Holding piece 51 has base end portion 51B inclined outward in the depth direction and distal end portion 51A inclined inward in the depth direction. Holding piece 51 may have a U shape instead of a V shape. The connection portion of base end 51B is connected only at the lower end of the insulator, but may be extended to the upper end of the insulator. This configuration increases connection strength between base end 51B and the insulator.

As illustrated in FIG. 3, the maximum length L1 between the pair of holding pieces 51 in the depth direction, the inner dimension L2 of the opening of exterior can 30 in the depth direction, and the length L3 between the pair of distal ends 51A in the depth direction on the distal end side in the insertion direction satisfy the relationship of L3<L2<L1.

The length L1 may be determined such that, when sealing plate 40 is inserted into exterior can 30 after holding member 50 is provided on sealing plate 40 and welding sealing plate 40 to exterior can 30, a length of exterior can 30 in the depth direction at a central portion in the height direction (the maximum length in the depth direction between long walls 30X facing each other) becomes a target length. L1 may be larger than any one of the dimensions of sealing plate 40 in the depth direction, the inner dimension of the opening of exterior can 30, and the inner dimension of bottom 30B of exterior can 30. Depending on a usage of the power storage device, when exterior can 30 is expanded to a size larger than a dimension of the holding member, and thus holding piece 51 may not necessarily contact long wall 30X.

For example, when exterior can 30 having no holding member 50 is deformed from the initial shape to the maximally expanded shape, the target length may be determined to be a median value of a length of exterior can 30 in the initial state in the depth direction at the central portion in the height direction and a length of exterior can 30 in the maximally expanded shape in the depth direction at the central portion in the height direction. The initial shape is a shape of exterior can 30 at the time of welding sealing plate 40 to exterior can 30. The maximally expanded shape is a shape of exterior can 30 being expanded when power storage device 10 is consumed.

The size of L3 depends on the size of L2. The size of L3 is, for example, preferably less than or equal to 80% of the size of L2. In addition, the size of L1 in holding member 50 may change in the width direction. For example, among the size of L1, L1 may become larger toward the midpoint of exterior can 30 in the width direction. This is because the midpoint portion of exterior can 30 is most likely to expand in the width direction.

The size of holding piece 51 in the height direction is determined such that at least holding piece 51 does not interfere with electrode assembly 20 while, for example, holding members 50 are provided on each of insulators 25 and 26 and are inserted into exterior can 30, and sealing plate 40 is welded to exterior can 30.

Processes for manufacturing power storage device 10 will be described below with reference to FIGS. 4(A) to 4(C). FIGS. 4(A) to 4(C) are schematic views of power storage device 10 for explaining a part of the manufacturing process of power storage device 10. In FIGS. 4(A) to 4(C), illustration of electrode assembly 20 and the like is omitted.

As illustrated in FIG. 4(A), electrode assembly 20 (see FIG. 1) and the electrolyte solution are accommodated in exterior can 30. Then, holding member 50 provided on each of insulators 25 and 26 of sealing plate 40 is inserted through opening 30H of exterior can 30 into exterior can 30. At this moment, because length L1 of the lower end of holding member 50 in the depth direction is smaller than length L2 of exterior can 30 in the depth direction, holding member 50 is easily inserted into exterior can 30.

As illustrated in FIG. 4(B), exterior can 30 is expanded in the depth direction by holding member 50 inserted into exterior can 30. At this moment, the width between long walls 30X of exterior can 30 held by holding member 50 is increased to maximum length L1 of holding member 50, causing the center length of exterior can 30 in the depth direction to be the target length.

As illustrated in FIG. 4(C), while holding member 50 is inserted into exterior can 30 and exterior can 30 is expanded in the depth direction, opening 30H of exterior can 30 is closed by jig K, and sealing plate 40 securely contact opening 30H of exterior can 30 and is welded to opening 30H.

A problem of the conventional rectangular battery and effects of power storage device 10 will be described below.

In the power storage device, the exterior can expand with aging degradation, and also expands or contracts with charging and discharging. In the power storage device, stress on a welded part between the exterior can and the sealing plate, and the welded part is fatigued to deteriorate the strength.

Here, regarding the deformation of the long wall of the exterior can, focusing on, for example, the displacement of the long wall in the expansion direction at the central part in the height direction, it is assumed that the displacement increases in the expansion direction. The displacement repeatedly increases or decreases within a predetermined displacement width or simply continuously increases in accordance with the expansion or contraction of the exterior can during charging and discharging of the power storage device. In order to reduce the maximum stress generated in the welded part so as not to exceed the yield strength of the stress, the amount of displacement of the exterior is reduced from the initial state to the expansion limit state of the power storage device. For this purpose, the shape of the exterior can at the time of being welded previously has an expanded shape.

According to power storage device 10 of the present exemplary embodiment, sealing plate 40 can be welded to exterior can 30 in a shape in which exterior can 30 is expanded in the depth direction by holding member 50. As a result, the amount of displacement of long wall 30X of exterior can 30 in the expansion direction from the initial state to the expansion limit decreases, and the stress (maximum stress) acting on the welded part between exterior can 30 expanded to the limit and sealing plate 40 decreases. As a result, the fatigue characteristics of the welded part can be improved.

Figure 5A:
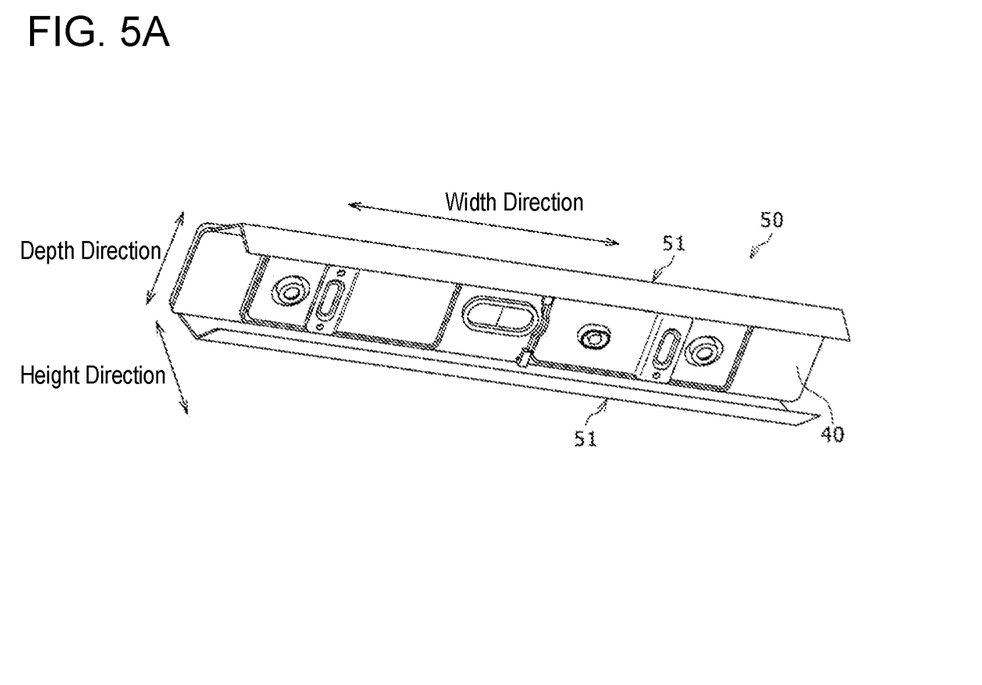
FIG. 5A is a perspective view of a holding member which is another example of the exemplary embodiment.
Figure 5B:
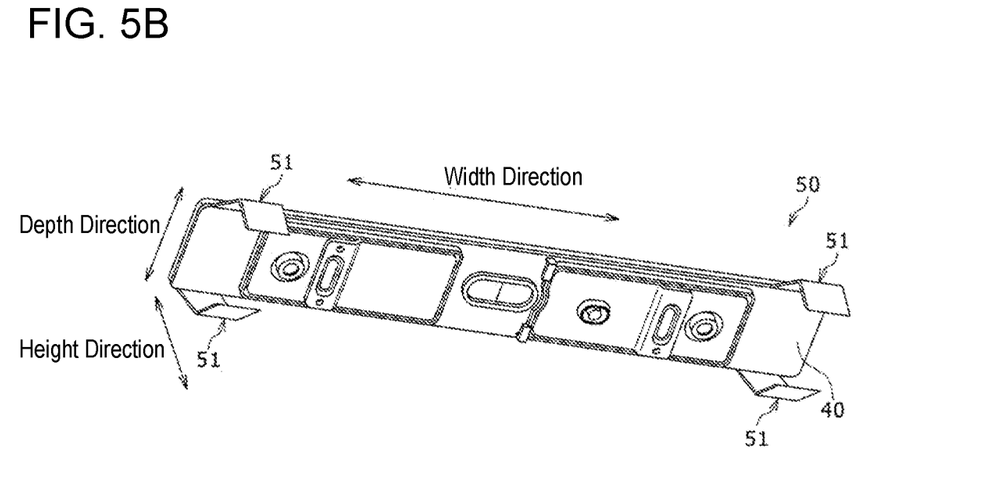
FIG. 5B is a perspective view of a holding member which is another example of the exemplary embodiment.
Figure 6A:
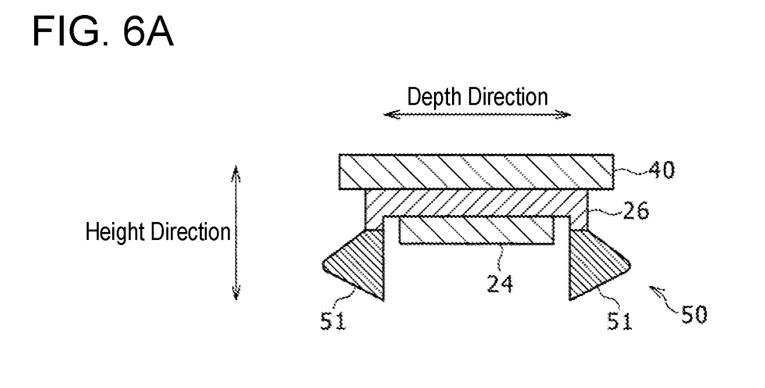
FIG. 6A is a perspective view of a holding member which is still another example of the exemplary embodiment.
Figure 6B:
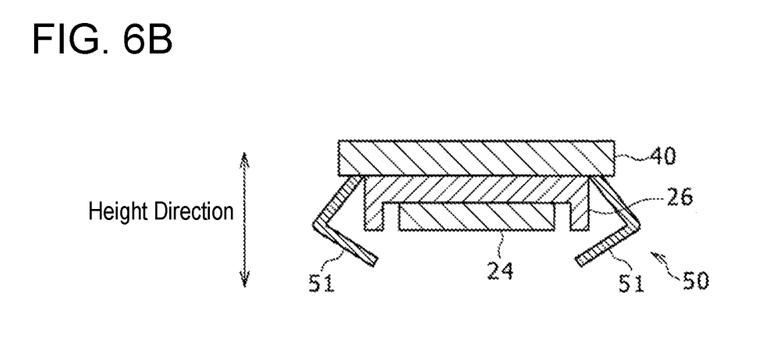
FIG. 6B is a perspective view illustrating a holding member which is yet still another example of the exemplary embodiment.
Figure 6C:
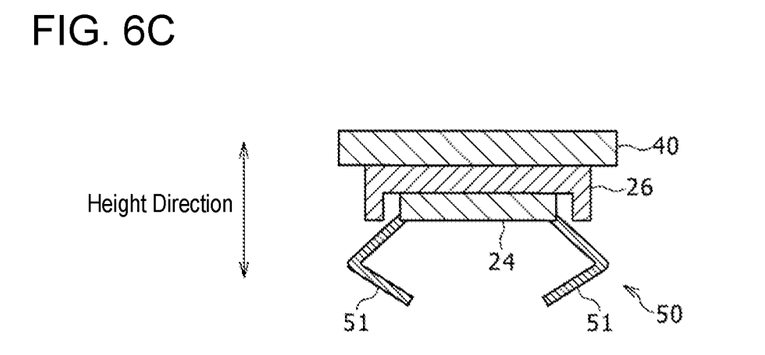
FIG. 6C is a cross-sectional view illustrating a holding member which is a further example of the exemplary embodiment.

Holding member 50 which is another example of the exemplary embodiment will be described below with reference to FIGS. 5A and 5B, and FIGS. 6A to 6C. FIGS. 5A and 5B are perspective views of sealing plate 40 when viewed from below. FIGS. 6A to 6C are views corresponding to cross-sectional views taken along line AA shown in FIG. 2.

Hereinafter, description of portions common to holding member 50 described above in another example of the exemplary embodiment are omitted, and only portions different from holding member 50 described above are described.

As illustrated in FIG. 5A, holding member 50 may be provided over the entire length in the width direction. Specifically, for example, holding pieces 51 may be provided at each of both ends of insulators 25 and 26 in the depth direction and over the entire length of insulators 25 and 26 in the width direction. Holding member 50 may be provided on sealing plate 40 or electrical collectors 23 and 24.

As illustrated in FIG. 5B, holding members 50 may be provided only at both ends in the width direction. For example, holding pieces 51 may be provided at both ends of each of insulators 25 and 26 in the depth direction and only at both ends of insulators 25 and 26 in the width direction. At this moment, holding member 50 may be provided on sealing plate 40 or electrical collectors 23 and 24.

As illustrated in FIG. 6A, holding piece 51 may be an elongated member having a substantially triangular shape in a cross section thereof perpendicular to the width direction, and may have one corner of the substantially triangular shape facing the outside in the depth direction. Holding member 50 may be provided on sealing plate 40 or electrical collectors 23 and 24. As illustrated in FIG. 6B, holding piece 51 of holding member 50 may be provided on sealing plate 40. In this case, holding piece 51 may be formed by assembling a separate insulator to the sealing plate or by a conductor. As illustrated in FIG. 6C, holding piece 51 of holding member 50 may be provided on electrical collector 23, 24. In this case, holding piece 51 is formed by assembling a separate insulator to the electrical collector or by a conductor. An insulating layer may be formed on the surface of holding piece 51 made of the above-described conductor or an insulating treatment may be performed. In addition, in the present exemplary embodiment, holding pieces 51 may arranged in the depth direction, but only one holding piece may be used. This single piece of holding piece 51 may hold both or only one of the pair of long walls 30X.

The present invention is not limited to the above-described exemplary embodiment and modified examples thereof, and it is a matter of course that various changes and improvements can be made within the scope of the matters described in the claims of the present application.

REFERENCE MARKS IN THE DRAWINGS 10 power storage device
20 electrode assembly 21 positive-electrode lead
22 negative-electrode lead
23 electrical collector
24 electrical collector
25 insulator
26 insulator
29 insulating holder
30 exterior can
30B bottom
30H opening
30X long wall
30Y short wall
40 sealing plate
41 positive-electrode terminal
42 negative-electrode terminal
45 pressure regulating valve
50 holding member
51 holding piece
51A distal end
51B base end

The invention claimed is:

1. A power storage device comprising:
an electrode assembly including a positive-electrode plate, a negative-electrode plate, and a separator which are stacked on one another, the separator being disposed between the positive-electrode plate and the negative-electrode plate;
an exterior can accommodating the electrode assembly and an electrolyte solution therein, the exterior can having a side wall with a tubular shape and an opening provided at one end of the side wall;
a sealing plate closing the opening of the exterior can; and
a holding member including one or more facing parts accommodated in the exterior can, each of one or more facing parts facing the side wall in a first direction and projecting toward the side wall,
wherein the sealing plate is welded to the exterior can at the opening such that the one or more facing parts expand the exterior can in the first direction.

2. The power storage device according to claim 1, wherein the one or more facing parts comprises a pair of facing parts arranged in the first direction with a predetermined interval between the pair of facing parts.

3. The power storage device according to claim 1, wherein the side wall overlaps the one or more facing parts when viewed from the opening of the side wall.

4. The power storage device according to claim 1, wherein the each of the one or more facing parts has a protruding portion having a distal end contacting the side wall.

5. The power storage device according to claim 1, wherein a maximum length of the one or more facing parts of the holding member in the first direction is larger than a length of an inside of the exterior can in the first direction.

6. The power storage device according to claim 1, further comprising a bottom closing another end of the side wall, wherein a maximum length of the one or more facing parts in the first direction is larger than a length of the bottom in the first direction.

7. The power storage device according to claim 1, wherein the each of the one or more facing parts has a length at a lower end in the first direction smaller than a length of the sealing plate in the first direction.

8. The power storage device according to claim 6, wherein a length of the one or more facing parts in the first direction at lower ends of the one or more facing parts is smaller than a length of the bottom in the first direction.

9. The power storage device according to claim 1, wherein the holding member is made of insulating material.

10. The power storage device according to claim 1, wherein the holding member is disposed on the sealing plate.

11. The power storage device according to claim 1, further comprising
an electrical collector connected to the positive-electrode lead or the negative-electrode lead of the electrode assembly, wherein
the holding member is provided on the electrical collector.

12. The power storage device according to claim 1, further comprising:
an electrical collector connected to the positive-electrode lead or the negative-electrode lead of the electrode assembly; and
an insulator insulating the electrical collector from the sealing plate, wherein
the holding member is provided on the insulator.

13. The power storage device according to claim 1, wherein the positive-electrode plate and the negative-electrode plate of the electrode assembly are stacked in the first direction.

14. The power storage device according to claim 1, wherein a maximum length of the one or more facing parts of the holding member in the first direction is larger than a length of an inside of the exterior can at the one end of the side wall in the first direction.

15. The power storage device according to claim 1, wherein
the each of the one or more facing parts has a protruding portion having a distal end that does not contact the side wall.

16. The power storage device according to claim 1, wherein
the each of the one or more facing parts includes two holding pieces forming a V shape, and the holding pieces forms an acute angle.

17. The power storage device according to claim 1, wherein
the each of the one or more facing parts includes two holding pieces forming a V shape, each of the two holding pieces has a first end and second end, the first ends of the two holding pieces joined together, and the two second ends do not connect each other.

18. A power storage device comprising:
an electrode assembly including a positive-electrode plate, a negative-electrode plate, and a separator which are stacked on one another, the separator being disposed between the positive-electrode plate and the negative-electrode plate;
an exterior can accommodating the electrode assembly and an electrolyte solution therein, the exterior can having a side wall with a tubular shape and an opening provided at least at one end of the side wall;
a sealing plate closing the opening of the exterior can; and
a holding member including one or more facing parts accommodated in the exterior can, each of one or more facing parts facing the side wall in a first direction and projecting toward the side wall,
wherein the one or more facing parts comprises a pair of facing parts arranged in the first direction, and
a maximum length between the pair of facing parts in the first direction is larger than a length of the sealing plate in the first direction.

* * * * *